July 22, 1958 — R. D. FREER — 2,844,432
FOOD SERVICE UNIT
Filed Aug. 15, 1955 — 4 Sheets-Sheet 1
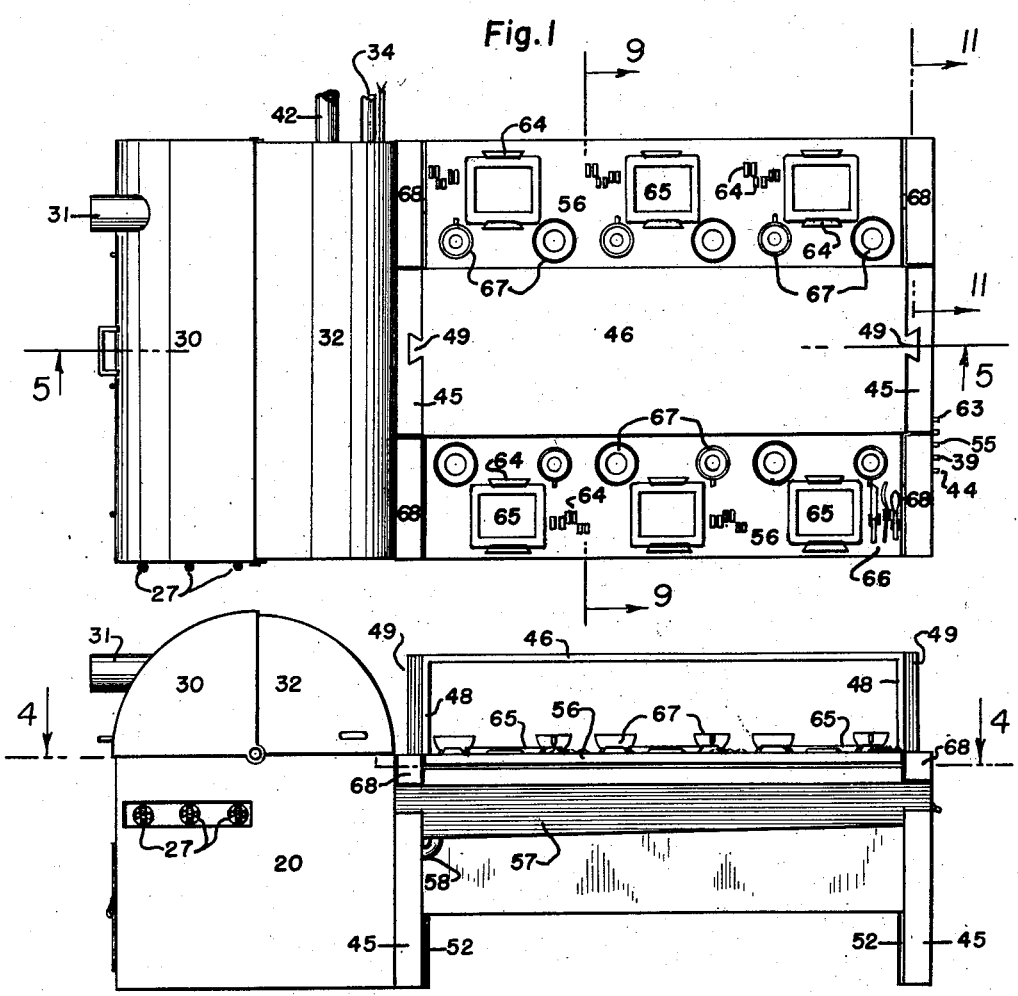
Fig.1
Fig.2
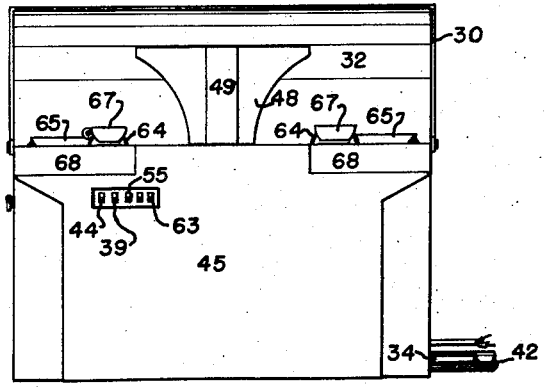
Fig.3
INVENTOR.
Raynerd D. Freer
BY
ATTORNEY

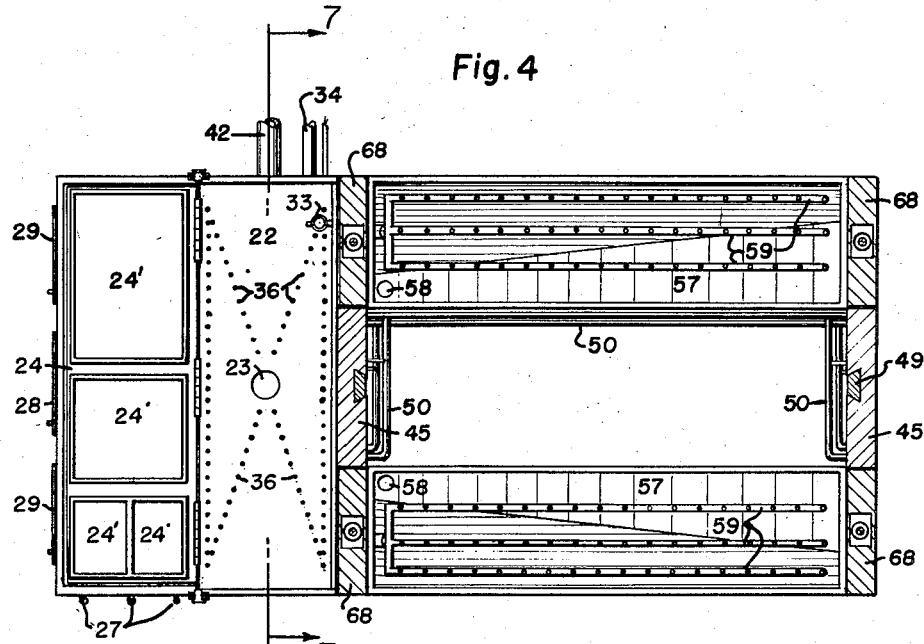
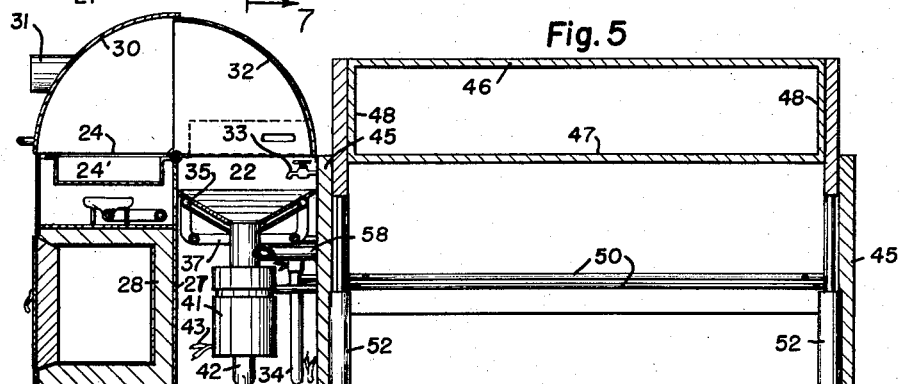
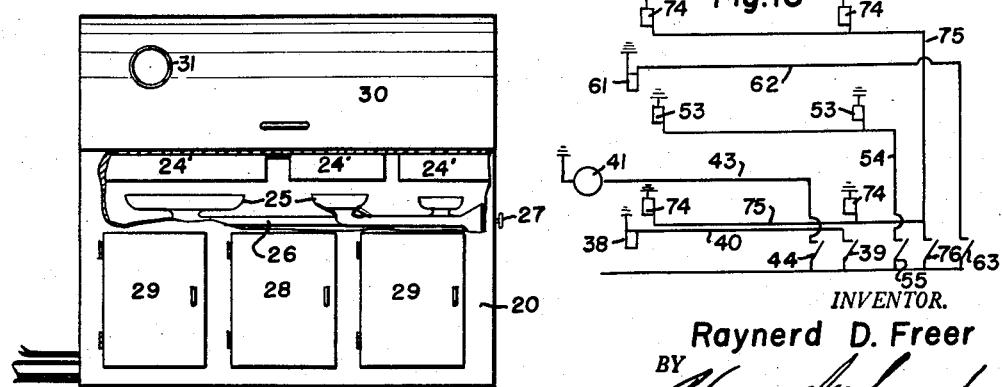

July 22, 1958 R. D. FREER 2,844,432
FOOD SERVICE UNIT
Filed Aug. 15, 1955 4 Sheets-Sheet 3
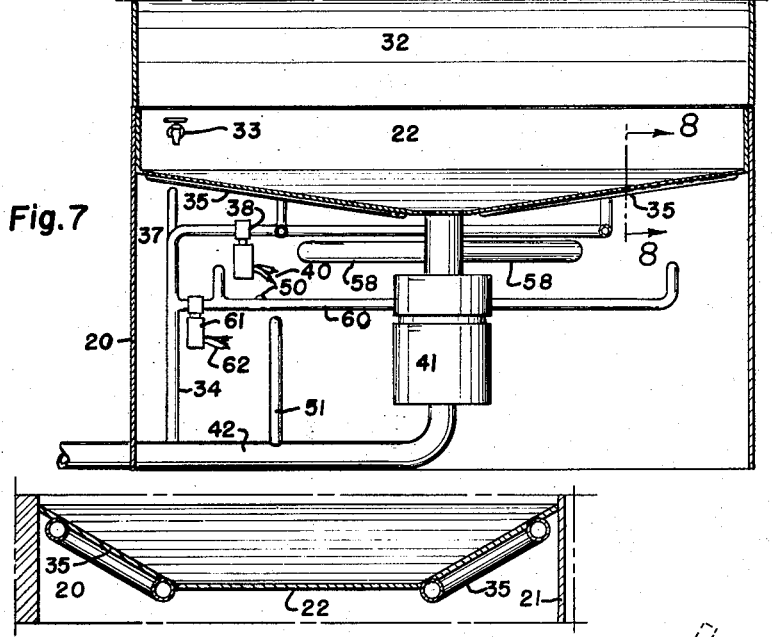
Fig. 7
Fig. 8
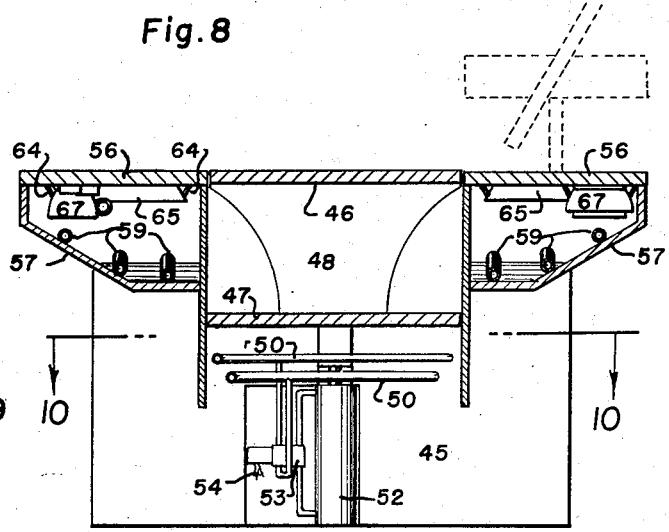
Fig. 9
Fig. 10
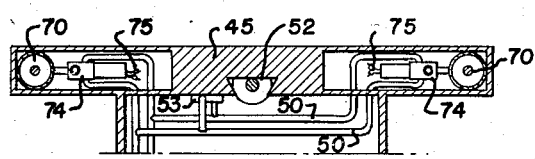
INVENTOR.
Raynerd D. Freer
BY
ATTORNEY July 22, 1958  R. D. FREER  2,844,432
FOOD SERVICE UNIT
Filed Aug. 15, 1955  4 Sheets-Sheet 4
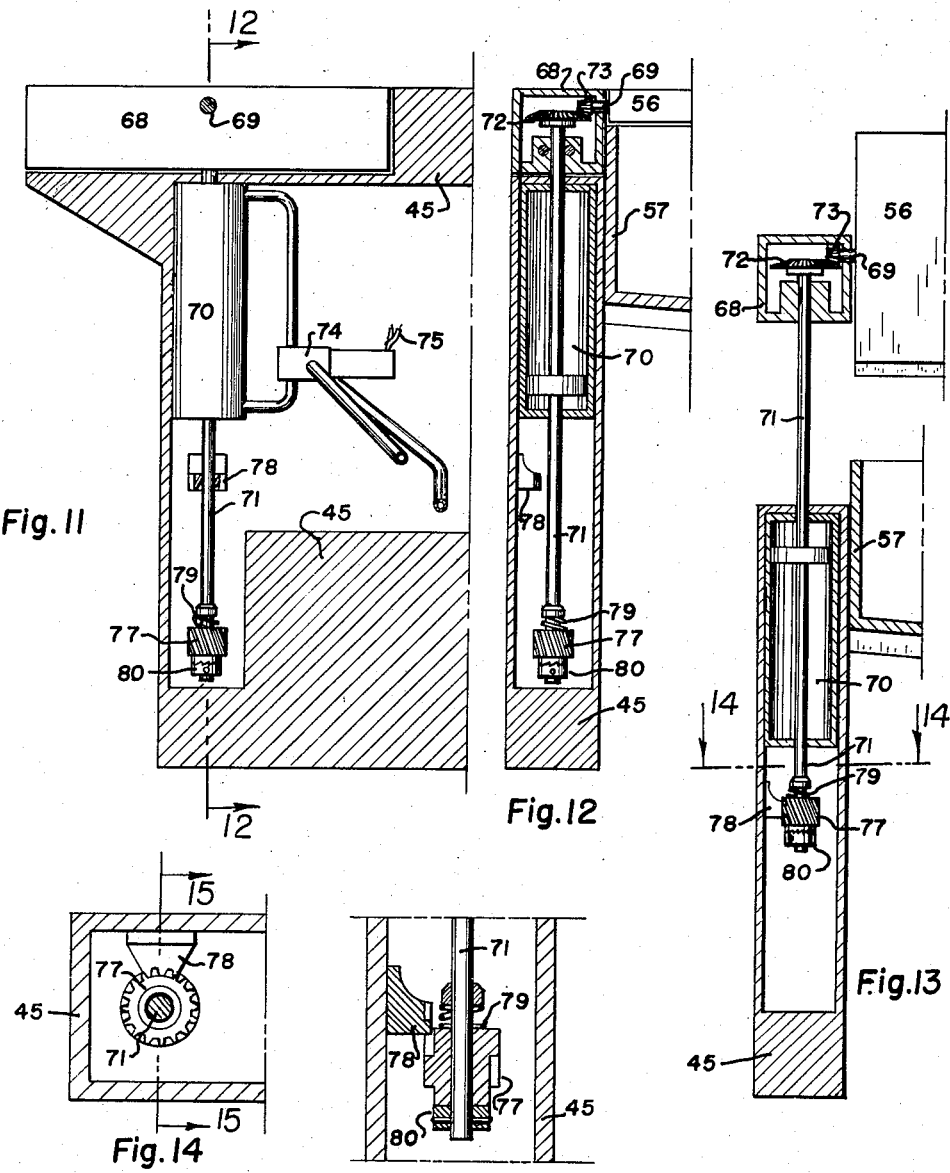
INVENTOR.
Raynerd D. Freer
BY
ATTORNEY

United States Patent Office 2,844,432
Patented July 22, 1958

2,844,432

FOOD SERVICE UNIT

Raynerd D. Freer, Gillette, Wyo.

Application August 15, 1955, Serial No. 528,186

7 Claims. (Cl. 312—228)

This invention relates to the practice of preparing, serving, and eating of human food, and more particularly to the facilities and instrumentalities incident thereto, and has as an object to provide a novel, improved, compact, and unitary assembly of all elements and agencies requisite for the cooking, serving and eating of meals, the disposal of wastes and the washing of the dishes and utensils employed.

A further object of the invention is to provide a novel and improved food service unit applicable to the preparation, serving, eating, and subsequent clean-up of meals with conservation of space, time, and effort.

A further object of the invention is to provide a novel and improved food service unit susceptible of operative installation in motels, apartments, house trailers, and like lodgings of limited area, in full substitution for the kitchen and dining facilities hitherto conventionally utilized.

A further object of the invention is to provide a novel and improved food service unit characterized by automatic table setting clean-up and dish-washing features obviating the customary handling and shifting of the utensils employed in the preparation and eating of meals.

A further object of the invention is to provide a novel and improved food service unit adapted to function in the intervals between meals as a smooth, flat-top table.

A further object of the invention is to provide a novel and improved food service unit susceptible of expedient production from known and available elements and materials, that is relatively inexpensive of construction and operative installation in any desired range of particular sizes and capacities, that is simple and convenient of practical use, and that is positive and efficient in attainment of the ends for which designed.

With the foregoing and other objects in view, my invention consists in the construction, arrangement, and operative combination of elements as hereinafter set forth, pointed out in my claims, and illustrated by the accompanying drawings, in which—

Figure 1 is a top plan view of a typical embodiment of the invention as conditioned for the serving and eating of a meal.

Figure 2 is a side elevation of the organization according to Figure 1.

Figure 3 is an end elevation of the arrangement according to the preceding views.

Figure 4 is a horizontal section through the organization according to the preceding views taken substantially on the indicated line 4—4 of Figure 2.

Figure 5 is a vertical section longitudinally through the organization according to the preceding views taken substantially on the indicated line 5—5 of Figure 1.

Figure 6 is an elevation of the end of the organization according to the preceding views opposite to that shown in Figure 3, certain housing elements being broken away to illustrate otherwise concealed construction and arrangements.

Figure 7 is a transverse section, on a relatively enlarged scale, taken substantially on the indicated line 7—7 of Figure 4, an upper portion of the view being broken away to conserve space.

Figure 8 is a fragmentary, detail section, on a further enlarged scale, taken substantially on the indicated line 8—8 of Figure 7.

Figure 9 is a transverse section, on the same scale as Figure 7, taken substantially on the indicated line 9—9 of Figure 1 with the movable panel elements of the table member in an alternative position and with an intermediate position of one of said panels indicated in broken lines.

Figure 10 is a fragmentary, detail section taken substantially on the indicated line 10—10 of Figure 9.

Figure 11 is a fragmentary, detail section, on a further enlarged scale, taken substantially on the indicated line 11—11 of Figure 1.

Figure 12 is a fragmentary, detail section taken substantially on the indicated line 12—12 of Figure 11.

Figure 13 is a view similar to Figure 12 with the movable elements of the latter view at an alternative limit of their range of travel.

Figure 14 is a fragmentary, detail section taken substantially on the indicated line 14—14 of Figure 13.

Figure 15 is a fragmentary, detail section taken substantially on the indicated line 15—15 of Figure 14.

Figure 16 is a conventionalized diagram of the connections and controls selectively manipulable for operation of the illustrated improvement in accordance with the principles of the invention.

A feature of the improved food service unit is a kitchen section for the preparation and cooking of foods. The kitchen section is constituted as a rectangular, open-top housing 20 of appropriate construction, size, and height bisected longitudinally by a vertical partition 21. At one side of the partition 21, a sink 22 formed with a floor sloped in all directions to a central drain 23 is fixedly inset to fill the otherwise open half-top of the housing 20, and the other half-top of the housing 20 is normally closed by a cooking plate 24, expediently formed as a plurality of integral compartments 24', hinged at one margin to the upper edge of the partition 21 for inversion, at times, in superposed closing relation over the sink 22, as indicated by broken lines in Figure 5. Conventional heating elements, represented as gas burners 25 served by a fuel line 26 through the usual individual controls 27, operatively underlie the cooking plate 24, or the separate compartments 24' thereof, when said plate is in its normal position remote from the sink 22, thus to provide a stove for the cooking of foods, and the space within the housing 20 beneath said burners accommodates a refrigerator unit 28 and cabinets 29 convenient for the storage of foods, and the like, in any preferred arrangement. A quadrantal hood 30, expediently provided with a vent 31, is hinged at its ends to upper end corners of the partition 21 to swing about an axis coincident with the partion upper margin between closing relation over the cooking plate 24 and such closing relation over the sink 22 as uncovers said plate for use, and a second quadrantal hood 32 is similarly hinged to swing about the same axis and interiorly of the hood 30 between covering and uncovering relation with the sink 22 and alternative covering and uncovering relation with the plate 24. Thus, when the kitchen section is not in use, the hoods 30 and 32 may be manipulated to the position shown in Figures 1 and 2 where they fully cover and house the sink 22 and plate 24 in a protective and sightly manner. When use of the sink 22 is desired, as for the preparation of foods, the hood 32 is swung interiorly of the hood 30 to fully uncover the sink which is then accessible at either end, and when the cooking plate 24 is to be availed of the hoods 30 and 32 are swung into covering relation with the sink to fully expose said plate and to open access to the sink across the plate.

The sink 22 is equipped with the customary tap, or taps, 33 served by a water flow line 34 leading from any available source or supply of water under pressure, and said line 34 connects in a usual manner with a water heater, not shown but feasible of accommodation within the housing 20 beneath the sink 22, operable in a conventional manner to maintain a pressured supply of heated water. Water flow lines 35 directly underlie the sloped floor areas of the sink 22 in any appropriate patterned arrangement and open through the sink floor in a multiplicity of jet apertures 36 through which the flow from said lines is delivered as a cleansing spray directed against the cooking surface of the plate 24 when the latter is inverted over the sink. The lines 35 are served with hot water from the conventional heater through a line 37 flow-controlled by means of an electrically-actuable valve 38 in a circuit 40 including a switch 39, whereby to provide for selective ejection of hot water pressure spray through the apertures 36 against and with cleansing effect upon the cooking plate 24 when the latter is inverted over the sink 22 for cleaning after use. The drain 23 from the sink 22 delivers to a conventional garbage disposal unit 41 directly under the sink within the housing 20 and said disposal unit discharges in a usual manner through a line 42 to waste. The motor of the disposal unit 41 is served by a circuit 43 including a switch 44 and is hence selectively operable to condition wastes delivered thereto from the sink 22 for ultimate disposition through the line 42.

Thus, in a compact unit characterized by a sink, stove, refrigerator, storage cabinets, hot and cold water supply, and garbage disposal unit discharging to waste, the kitchen section is complete when conventionally connected with service and supply facilities for the operations incident to preparing and cooking of foods, and for the cleansing of the utensils employed, all with conservation of space and effort.

A dining section for the consumption of the foods prepared at the kitchen section is directly associated and operatively correlated with the latter in a uniquely convenient manner. Susceptible of wide variation as to structural detail, a typical embodiment of the dining section is represented as a multi-panel, flat-top table of appropriate height sized for the accommodation of a desired number of diners, such as six. As illustrated, the table elements of the dining section are supported by and coactively associated with a pair of like, spacedly-parallel, vertical pedestals 45 whereof one is fixed to the long wall of the housing 20 underlying the side of the sink 22 remote from the cooking plate 24 to dispose its complement at a distance from said housing determinative of the table length. Perpendicular to and spanning between central portions of the pedestals 45, a flat, rectangular panel 46 adapted to lie at times flush with the upper ends of said pedestals symmetrically defines the longitudinally central area of the table and constitutes the top closure of an open-sided frame including a bottom panel 47 coextensively underlying and registered with the panel 46 and ends 48 rigidly engaged with and between the corresponding ends of the panels 46 and 47 parallel to and closely adjacent the inner faces of the pedestals 45. The open-sided frame typified by the panel 46 is slidably engaged, as by means of mitered strips 49 on the ends 48, with and to reciprocate vertically relative to the pedestals 45 between a lower position in which the panel 46 is coplanar with the upper ends of the pedestals, as in Figure 9, and an upper position in which the bottom panel 47 is coplanar with the pedestal upper ends, as in Figures 2, 3 and 5 Actuation of the open-sided frame to and between its limiting positions may be variously accomplished, but an expedient arrangement for such purposes is illustrated as an hydraulic system including fluid flow lines 50 pressure-served by the line 34 and delivering to waste through a line 51, an hydraulic ram 52 recessed centrally of each pedestal 45 with its extensible element connected to the lower end of each strip 49, a two-way, electrically-actuable valve 53 in synchronous controlling relation with the flow from the lines 50 to each of the rams 52, a circuit 54 simultaneously serving both said valves 53, and a switch 55 in and for the selective control of said circuit. As so arranged, one position of the switch 55 operates to retract the rams 52 and to thereby position and hold the open-sided frame with the panel 46 coplanar with the upper ends of the pedestals, and the other position of said switch operates to extend the rams 52 for positioning of the panel 47 coplanar with pedestal upper ends in a consequent elevation of the panel 46. With the open-sided frame lowered, the panel 46 is the central panel element of a flat-top table, while in the elevated position of the frame the panel 47 functions as a support, coplanar with the other elements of a table top, for condiments and accessories conveniently stored within the frame and thus made available to diners at the opposite sides of the table.

The table of the dining section is completed by a panel 56, reversible in a mounting hereinafter elaborated, coextensive in length with the panels 46 and 47 of the open-sided frame and at each side of the latter. Simultaneously and similarly operable in an identity of construction and mounting, each of the panels 56 is adapted to close over and seal in both of its reversible positions against the otherwise open top of an elongated trough 57 outwardly paralleling the opposite long sides of the frame represented by the panels 46 and 47. The floor of each trough 57 is sloped, preferably both laterally and longitudinally, to a low point adjacent the kitchen section from which a drain 58 delivers to the garbage disposal unit 41, thus to direct wastes collected in said troughs through said unit to ultimate discharge. Within each trough 57, an array of flow lines 59 is arranged and apertured for the generation of a multiplicity of jets directed toward the open top of the trough, and a supply line 60 connects both of the arrays 59 with the water heater of the assembly through an electrically-actuable valve 61. The valve 61 is served by a circuit 62 including a switch 63 in a manner effective for selective control of hot water flow to and for ejection from the arrays 59 in an obvious and conventional manner. Corresponding faces of the panels 56 are equipped with clips and retainers 64, of any appropriate type and particular construction, adapted to engage and securely retain thereon the plates 65, cutlery 66, and other utensils 67, constituting place settings suitable for dining, whereby to expose said place settings ready for use on the upper faces of the panels in one position of the latter and to, alternatively, invert said place settings over and within the associated troughs 57 subject to jet action from the arrays 59 when the panels 56 are reversed.

Provision for control and selective adjustment of the positions of the panels 56 may be made in various ways, but it is feasible and convenient to use an hydraulic system for such purpose in substantially the manner illustrated. As shown, outer upper corners of the pedestals 45 are similarly notched to accommodate therein a separate, box-like member 68 at each end of each panel 56 in a member length substantially equal to the width of the associated panel, and trunnions 69 projecting from the ends of each panel 56 on the longitudinal median line thereof are journaled in and through the adjacent walls of said members 68 to thereby mount said panels in supported relation with the associated members and for rotation relative thereto about the panel center line. Directly and centrally beneath each member 68, an hydraulic ram 70 is fixed and recessed vertically within the corresponding leg of the pedestal 45. The rams 70 are characterized by a movable element having a stem 71 rotatably and reciprocably engaged through and projecting beyond each end of the associated cylinder, and the upper end of each such stem 71 is journaled in and through the bottom of each member 68 to mount therewithin a bevel gear 72 in meshing relation with a bevel pinion 73 on the end of the corresponding trunnion 69. The rams 70 and their stems 71 are so mounted and arranged as to seat the members 68 in the corner notches of the pedestals 45 and to close the panels 56 over the troughs 57 when the stems 71 are at the lower limit of theri reciprocable range and to elevate said members and the panels carried thereby a distance sufficient to permit rotation of the panels about the axes of their trunnions 69 when the stems are at the upper limit of their travel range. The rams 70 are served for simultaneous, synchronous actuation by pressured fluid delivered through the flow lines 50 under control of an electrically-actuable valve 74 at each said ram, all of which valves 74 are served by a common circuit 75 including a switch 76. As so arranged, actuation of the switch 76 operates through simultaneous positioning of the valves 74 to synchronously and correspondingly elevate all of the ram stems 71 and the members 68 and panels 56 carried thereby and to then return the side stems and associated elements to normal lowered position.

Reversal of the panels on and about the axes of the trunnions 69 is automatically accomplished as an incident of stem 71 upward travel after the panels have been elevated into appropriate clearing relation with their troughs 57 and is effected through engagement of a worm gear 77 carried by the lower end of each stem 71 with gear teeth or fingers 78 fixed in the pedestal leg in the path and near the upper limit of gear travel with said stem. To effect rotation the stem 71 for rotation of the associated panel 56 in the desired direction and amount, the gear 77 is loose on the stem 71 and connects with and for rotation of the latter through ratchet teeth at its lower end yieldably urged by means of a spring 79 into engagement with complementary teeth on a ratchet collar 80 fixed to the stem. With the elements properly proportioned and the gear and the ratchet teeth suitably pitched, engagement of the gear 77 with the fixed fingers or teeth 78 as the stem 71 approaches the upper limit of its travel range rotates said gear and, by virtue of the ratchet clutch, also rotates the stem to effect rotation by means of the gear 72 and pinion 73 of the associated panel 56 through a half revolution. The stem 71 is arranged with sufficient frictional resistance to rotation as to induce the gear 77 to ratchet relative to the collar 80 during downward travel of the stem 71 and until said gear has cleared the fixed teeth or fingers 78, thus to retain the panels 56 in the reversed positions to which they were moved during upward travel of the stem.

Elevation and reversal of the panels 56 is thus a complete cycle initiated through actuation of the switch 76 when the members 68 are seated in the corner notches of the pedestals 45 and the panels are closed over their respective troughs 57 in coplanar relation with the pedestal upper ends and one or the other of the panels 46 and 47, which cycle is concluded by return of the members to seated relation with their notches and return of the panels, inverted through a half revolution, to closing relation with their troughs.

From the foregoing it should be clear that simple manipulation of the appropriate switches, conveniently banked on one of the pedestals 45, is all that is required to condition the section for dining purposes with the place settings exposed on the upper faces of the panels 56 and the open-sided frame elevated to coplanar relation of the panels 47 and 56 with consequent availability of the materials carried within the frame, all in convenient juxtaposition with the kitchen section from which the prepared food may be served with ease. At the conclusion of a meal, actuation of the switches is had to elevate, reverse, and return the panels 56 for inversion of the place settings within the troughs 57 where soap may be automatically dispensed and they are washed by jets from the arrays 59 and left to drain and dry; the unobstructed, upwardly-directed faces of the inverted panels cooperating with the panel 46 of the lowered open-sided frame to define a smooth table top useful for many purposes.

Since changes, variations, and modifications in the form, construction, and arrangement of the elements shown and described may be had without departing from the spirit of my invention, I wish to be understood as being limited solely by the scope of the appended claims, rather than by any details of the illustrative showing and foregoing description.

I claim as my invention—

1. A unit of the character described comprising a sink having a drain equipped with a garbage disposal unit and served by a water supply line, burners mounted for operation at one side of said sink, a cooking plate hinged at the side of the sink adjacent said burners for selective adjustment between superposition over the burners and inversion over the sink, means served by said water supply line selectively actuable for the ejection of spray from said sink against the surface of the cooking plate inverted thereover, troughs fixedly outstanding in spaced parallelism from the side of the sink remote from said burners, drains connecting said troughs with said garbage disposal unit, panels invertible in closing relation with said troughs, place settings on and invertible with said panels, means selectively actuable to simultaneously and similarly position said panels relative to their associated troughs, means served by said water supply line selectively actuable for the ejection of spray from said troughs against the surfaces of the panels closed thereover, and an open-sided frame altitudinally reciprocable between said invertible panels in table-completing relation therewith.

2. The organization according to claim 1, wherein said cooking plate is an integral assembly of diverse utensils sized to cover and close over the sink.

3. The organization according to claim 1, wherein said troughs are paired to outstand adjacent the ends and perpendicular to the side of the associated sink and are floored at a lateral and longitudinal inclination to drains at the inner end corners thereof adjacent the sink.

4. The organization according to claim 1, wherein the invertible panels are individually mounted for rotation about an axis on the longitudinal median line thereof in bearings altitudinally reciprocable relative to the associated trough.

5. The organization according to claim 1, wherein the invertible panels are individually mounted for rotation about an axis on the longitudinal median line thereof in bearings altitudinally reciprocable relative to the associated trough, and the means for selectively positioning said panels relative to their troughs comprises a system reactive to a single control to simultaneously and correspondingly reciprocate all of said bearings and to rotate the panels through a half revolution each as an incident of such reciprocation.

6. The organization according to claim 1, wherein said open-sided frame is formed with coextensive, spacedly parallel, upper and lower panels adapted to close between the invertible panels, and is mounted to slide on vertical guides between limiting positions wherein its upper and lower panels are respectively coplanar with the invertible panels as closed over their associated troughs.

7. The organization according to claim 1, wherein said open-sided frame is formed with coextensive, spacedly parallel, upper and lower panels adapted to close between the invertible panels, is mounted to slide on vertical guides between limiting positions wherein its upper and lower panels are respectively coplanar with the invertible panels as closed over their respective troughs, and is reactive to a system under a single control manipulable to position and to hold said frame at either of its limiting positions.

References Cited in the file of this patent

UNITED STATES PATENTS

| | | |
|---|---|---|
| 1,373,506 | Hoyt | Apr. 5, 1921 |
| 1,513,357 | Webber | Oct. 28, 1924 |
| 1,952,568 | Schapp | Mar. 27, 1934 |
| 2,000,981 | Parsons | May 14, 1935 |
| 2,045,890 | Whalt | June 30, 1936 |
| 2,222,960 | Strachan | Nov. 26, 1940 |
| 2,328,130 | Earle | Aug. 31, 1943 |